(12) United States Patent
Shi et al.

(10) Patent No.: US 7,787,908 B2
(45) Date of Patent: Aug. 31, 2010

(54) MULTI-CALL DISPLAY MANAGEMENT FOR WIRELESS COMMUNICATION DEVICES

(75) Inventors: Guangming (Carl) Shi, San Diego, CA (US); Hai Qu, San Diego, CA (US); Young Rhee, San Diego, CA (US); Karthick Chinnaswami, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 180 days.

(21) Appl. No.: 10/232,646

(22) Filed: Aug. 30, 2002

(65) Prior Publication Data
US 2004/0203674 A1 Oct. 14, 2004

Related U.S. Application Data

(60) Provisional application No. 60/365,964, filed on Mar. 19, 2002.

(51) Int. Cl.
*H04M 1/00* (2006.01)

(52) U.S. Cl. ............. 455/566; 379/88.13; 379/93.17; 379/93.23

(58) Field of Classification Search .......... 455/415, 455/414.1, 508, 566, 567, 568, 41.2, 436, 455/412.1, 416, 553.1, 556.2, 465, 426.1, 455/552.1; 709/227; 379/142.01, 142.17, 379/202.01, 29.1, 88.11, 93.17, 93.23, 121.02–121.04, 379/122, 88.13; 715/753
See application file for complete search history.

(56) References Cited

U.S. PATENT DOCUMENTS

| | | | | |
|---|---|---|---|---|
| 5,327,482 A | * | 7/1994 | Yamamoto | 455/465 |
| 5,754,960 A | * | 5/1998 | Downs et al. | 455/508 |
| 6,178,338 B1 | * | 1/2001 | Yamagishi et al. | 455/566 |
| 6,400,814 B1 | * | 6/2002 | Adams | 379/142.01 |
| 6,430,395 B2 | * | 8/2002 | Arazi et al. | 455/41.2 |
| 6,516,202 B1 | * | 2/2003 | Hawkins et al. | 455/556.2 |
| 6,526,274 B1 | * | 2/2003 | Fickes et al. | 455/414.1 |
| 6,757,372 B1 | * | 6/2004 | Dunlap et al. | 379/142.17 |
| 6,807,433 B2 | * | 10/2004 | Yamashita et al. | 455/566 |
| 2002/0037754 A1 | * | 3/2002 | Hama et al. | 455/566 |
| 2002/0042288 A1 | * | 4/2002 | Nakayama | 455/553 |
| 2002/0073207 A1 | * | 6/2002 | Widger et al. | 709/227 |
| 2002/0077158 A1 | * | 6/2002 | Scott | 455/567 |
| 2002/0093531 A1 | * | 7/2002 | Barile | 345/753 |
| 2003/0073430 A1 | * | 4/2003 | Robertson et al. | 455/416 |
| 2003/0148790 A1 | * | 8/2003 | Pappalardo et al. | 455/558 |
| 2004/0192292 A1 | * | 9/2004 | Chang et al. | 455/426.1 |

* cited by examiner

*Primary Examiner*—MD S Elahee
(74) *Attorney, Agent, or Firm*—Nicholas A. Cole

(57) ABSTRACT

Techniques to manage the display of information for multiple voice and/or data calls in wireless devices. The techniques can manage a summary of all calls that are in progress and detailed information for individual calls. In one method, summary information is initially provided (e.g., to a display) for the multiple calls. The summary information may include, for example, the type and status of each call. An indication is then received to view detailed information for a selected call. In response, the detailed information for the selected call is provided. The detailed information for the selected call may include, for example, the caller name, call number, call duration, and so on. The detailed information for a data call may indicate various attributes for the data call (e.g., data rate, connection status, activity, service type, billing information, and so on).

37 Claims, 6 Drawing Sheets

MULTI-CALL DISPLAY MANAGEMENT FOR WIRELESS COMMUNICATION DEVICES

RELATED APPLICATION

This application claims the benefit of provisional U.S. Application Ser. No. 60/365,964, entitled "Method of Managing the Display of Multiple Calls in Wireless Phones," filed Mar. 19, 2002, which is incorporated herein by reference in its entirety for all purposes.

BACKGROUND

1. Field

The present invention relates generally to wireless communication, and more specifically to techniques for managing the display of information for multiple calls in wireless communication devices.

2. Background

Wireless communication systems are widely deployed to provide various types of communication such as voice, packet data, video, messaging, and so on. These systems may be multiple-access systems capable of supporting communication with multiple users and may be based on code division multiple access (CDMA), time division multiple access (TDMA), frequency division multiple access (FDMA), or some other multiple access techniques.

Many communication systems allow a user to maintain multiple calls concurrently with a single wireless communication device (e.g., a cellular phone). The multi-call capability is desirable for many applications. For example, a user may exploit the multi-call capability to make a three-way or conference call whereby two or possibly more calls to different phone numbers are concurrently maintained. As another example, a user may maintain multiple calls to implement video conferencing, with a voice call being maintained for voice communication and a data call being maintained for video. As yet another example, a user may be logged on to the Web with a data call and may thereafter receive and accept a voice call from another user via the same wireless device, without having to drop the data call.

When multiple calls are in progress on a wireless device, it is desirable to be able to provide the user with pertinent information regarding these calls, if and when requested. For many wireless devices, this is made challenging by several factors. First, the display screens for many wireless devices are relatively small, which limits the amount of information that may be shown. Second, as the number and types of services offered by service providers grow and as the options and configurations for these services increase, there may be a large amount of information available for calls.

There is therefore a need in the art for techniques to efficiently display information for multiple calls.

SUMMARY

Techniques are provided herein to manage the display of information for multiple calls in wireless devices. These multiple calls may include voice and/or data calls. The techniques can manage a summary of all calls that are in progress and detailed information for individual calls. The techniques also allow a user to view the summary information for all in-progress calls and the detailed information for any in-progress call.

In an embodiment, a method is provided for managing the display of information for multiple calls in a wireless communication device (which may be a cellular phone, a terminal, a PDA, or some other device). In accordance with the method, summary information is initially provided (e.g., to a display) for the multiple calls. The summary information may include, for example, the type and status of each call. An indication is then received to view detailed information for a selected call. In response, the detailed information for the selected call is provided. The detailed information for the selected call may include, for example, the caller name, call number, called name, called number, call duration, and so on. The detailed information for a data call may indicate various attributes for the data call (e.g., data rate, connection status, activity, service type, billing information, and so on).

If an indication is received to view detailed information for another selected call, then the detailed information for the new selected call is provided. If an indication is received to process a new call, then the new call is added to a list of calls if it is connected. If an indication is received to disconnect an in-progress call, then the list of calls is updated to remove the call after it has been disconnected. The summary information is also updated whenever the list of calls is updated. An idle display may be shown if the list is empty.

Various aspects and embodiments of the invention are described in further detail below. The invention further provides methods, program codes, integrated circuits, wireless communication devices, and other apparatuses and elements that implement various aspects, embodiments, and features of the invention, as described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

Figure 1:
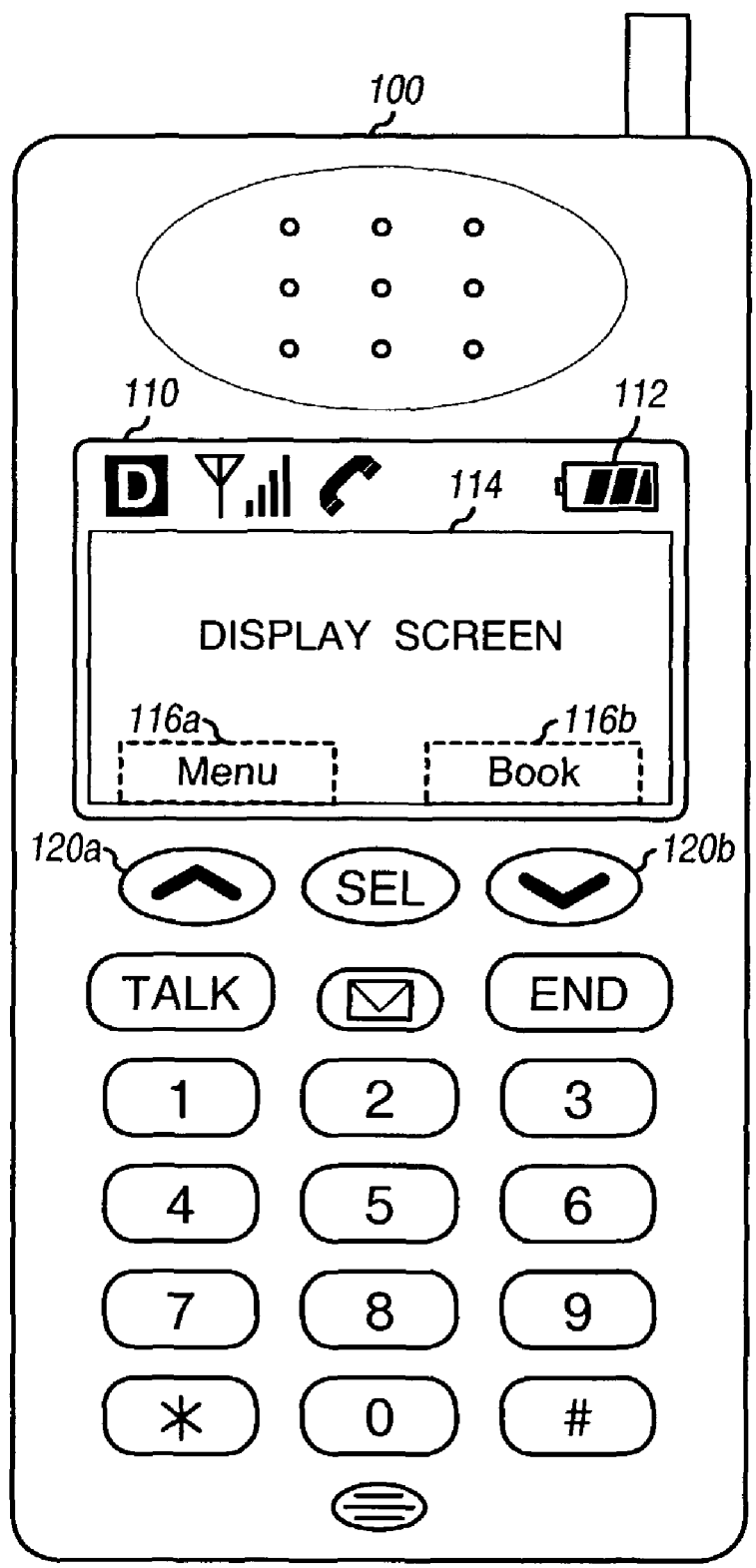
FIG. 1 shows an example wireless communication device.

FIG. 1 shows an example wireless communication device 100 that can implement the multi-call display management techniques described herein. Wireless device 100 includes a number of functional elements such as a speaker, a microphone, a display 110, a keypad, and so on.

Display 110 typically shows annunciators 112 on the top row of the display. These annunciators are used to show the status of the device and are displayed as appropriate. Display 110 further includes a display screen 114 that is used to show information for calls and soft-key menu options (if any). Each such soft-key menu option may be selected by pressing an associated physical key. For example, soft-key menu options 116a and 116b may be selected by pressing "Scroll Up" and "Scroll Down" keys 120a and 120b, respectively. The soft-key menu options can change depending on the state of the display and the type of information being shown, as described in further detail below. Moreover, the number of soft-key menu options that may be displayed on the screen at any given moment may be limited by (1) the size of the display screen and (2) the availability of physical keys that may be used for the soft-key menu options.

It is highly desirable to make the size of wireless devices as small as possible to enhance their portability. However, there is inherent limitation on the size reduction that can be achieved for some of the functional elements. For example, the keys need to be of certain minimum size so that they can be pressed easily by the user. Because of the small device size and the inability to further reduce the size of certain functional elements, the display screens on these devices are typically small.

Many wireless communication systems support different types of calls, two of which are commonly referred to as "voice" and "data". As used herein, a "call" refers to a communication session of a certain type of service between a wireless device and a wireless communication network. For cdma2000, each call is also associated with a particular service option (SO) that defines the manner in which data is to be processed by the wireless device and the network for that call. A voice call is typically characterized by the assignment of a dedicated channel to the user for the entire duration of the call. This channel is typically a code channel for CDMA systems and a set of time slots for TDMA systems. As used herein, a data call refers to all other types of call except for voice call. Depending on the application, a data call is typically associated with a higher data rate than that for a voice call and may or may not be continuously active. For example, a data call for live video may require a particular constant data rate whereas a data call for Web surfing may be bursty. Other types of call may include Test Data Service Option (TDSO) (in CDMA), Test Control (in GSM/UMTS), Markov call, Loop-back call, and so on.

Many wireless communication systems also support multiple concurrent calls. This multi-call capability may be advantageously used to support various types of services such as, for example, three-way calling, teleconferencing, video conferencing, simultaneous voice and data connection, and so on.

A user may maintain multiple calls at any given moment with a single wireless device. These calls may be of different types (e.g., voice and data), have different status (e.g., active and on-hold/dormant), are connected for different amounts of time, and so on. Moreover, certain types of call may be associated with additional information, which may relate to billing, connection type, and so on. It is desirable to be able to provide pertinent information for calls to the user, whenever requested and in formats that are easy to comprehend.

As used herein, an "incoming pending call" is one that is being received but not answered. An "outgoing pending call" is one that is being originated but not yet connected. An "in-progress" or "connected" call is one that is connected. An in-progress voice call can be either active or on-hold, and an in-progress data call can be either be active or dormant. An "active call" is one wherein data is being transmitted and/or received for the call. A "dormant call" is one wherein no data has been transmitted or received for the call within a particular time period.

Techniques are provided herein to manage the display of information for multiple calls in wireless devices. These multiple calls may be multiple voice calls (e.g., for three-way, conference, and multi-party calls), multiple data calls (which are supported by IS-2000 Release A, UMTS 3GPP, and so on), or simultaneous voice and data calls (which are also supported by IS-2000 Release A, UMTS 3GPP, and so on). These techniques can manage a summary of all calls that are in progress and detailed information for individual calls. These techniques further allow the user to view the summary information for all in-progress calls and the detailed information for any in-progress call.

Figure 2:
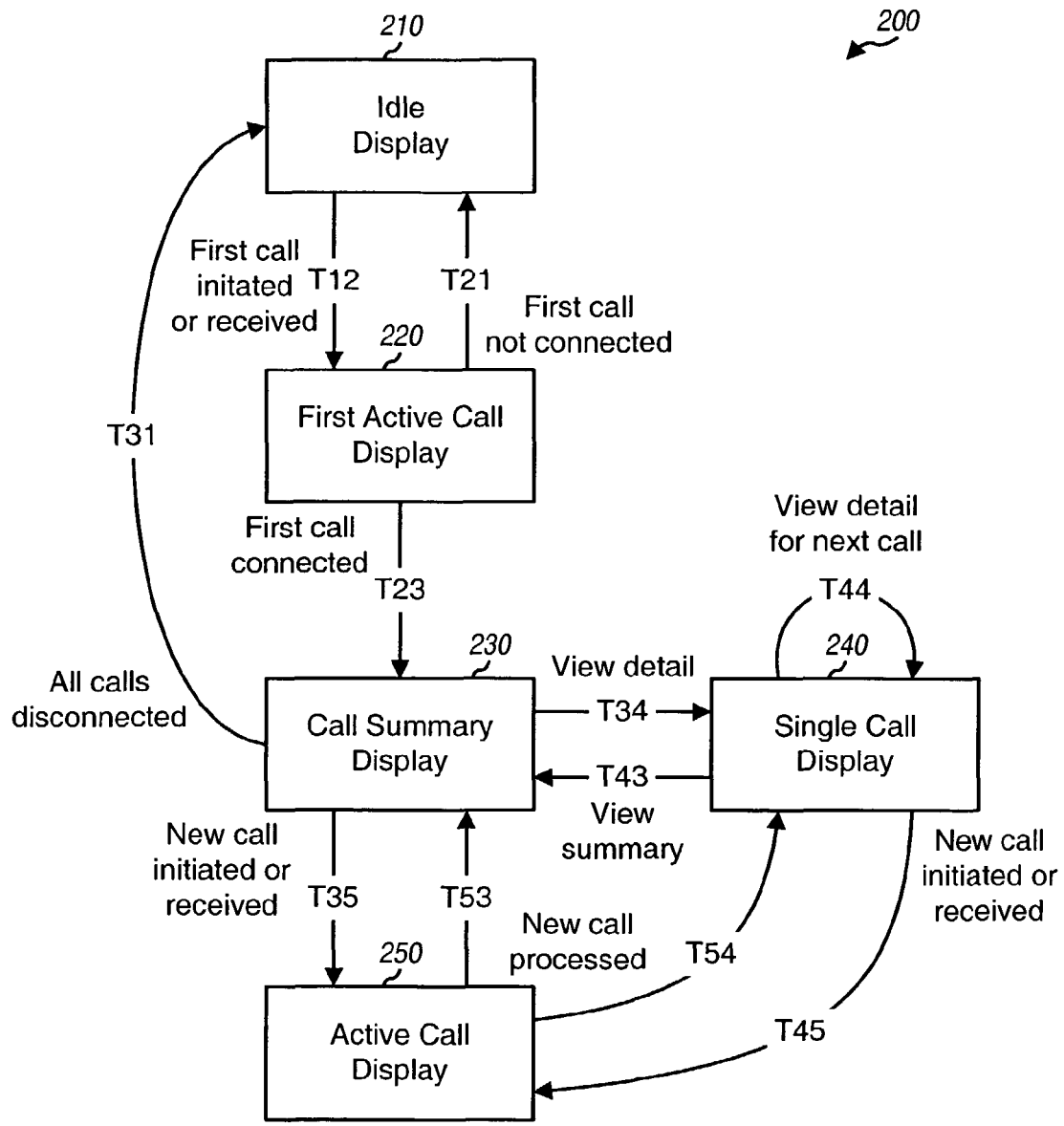
FIG. 2 shows an example call display management state diagram.

FIG. 2 shows an embodiment of a call display management state diagram 200. In this embodiment, the state diagram includes five states: an Idle Display state 210, a First Active Call Display state 220, a Call Summary Display state 230, a Single Call Display state 240, and an Active Call Display state 250. The display of the wireless device is in one of these five states at any given moment.

FIGS. 3A through 3F show example displays for the various states of call display management state diagram 200. These displays are used to more clearly describe the operation of the state diagram. In general, various types of information may be shown on the display of the wireless device. The information shown in FIGS. 3A through 3F is illustrative and not intended to be limitation on the types of information that may be shown on the display.

Referring back to FIG. 2, the display is initially in Idle Display state 210 when no calls are in progress and when the first outgoing or incoming call is to be processed. If no calls are pending, then the display may show certain basic information such as, for example, the service provider's name, the day and date, the time of the day, and so on, as shown by display 310 in FIG. 3A. Idle Display state 210 is also used to assist the user originate an outgoing call. For example, the user may enter the phone number to be called by pressing the keys on the device's keypad or by scrolling through a phone book maintained by the device. The display would then show the results of these actions. Upon initiating the outgoing call (by the user pressing the "Send" key) or receiving an indication of an incoming call, the display transitions to First Active Call Display state 220 (T12 in FIG. 2).

In First Active Call Display state 220, the display shows the current status of the first call. If the first call is an outgoing call, then the display may show that the wireless device is making the call, the name of the person/entity being called, and the phone number, as shown by display 320a in FIG. 3B. Alternatively, if the first call is an incoming call, then the display may show that the wireless device is receiving the call (e.g., "Incoming Call . . . "), the name of the caller (if known), and the phone number (if known), as shown by display 320b in FIG. 3C.

First Active Call Display state 220 is also used to process call control messages from the network and/or requests from the user for the first call. For example, the network may send a message indicating that the outgoing call has been connected. For an incoming call, the user may request to accept the call by pressing the "Talk" key or to reject the call by pressing the "End" key or no key at all. If the first call is connected (e.g., by the user pressing the "Talk" key for an incoming call or receipt of a call connect message from the network for an outgoing call), then the display transitions to Call Summary Display state 230 (T23 in FIG. 2). Otherwise, if the first call is not connected, then the display transitions back to Idle Display state 210 (T21 in FIG. 2).

Call Summary Display state 230 is used to show a summary of all calls that are in process, including the first call. In general, any type of information may be shown for the in-progress calls in the summary display. However, the amount of information that may be shown for the summary display is limited by the size of the display screen. In a specific embodiment, the summary display shows a list of all in-progress calls (e.g., "Call 1", "Call 2", and so on), the status of each call (e.g., active "[A]" or on-hold "[H]"), the call type (e.g., voice "[V]" or data "[D]"), and so on, as shown by display 330 in FIG. 3D. Other information that may alternatively or additionally be shown in the summary display may include the caller name, phone number, connection time for the call, charge information (e.g., e.g. money spent so far for the call, money left for pre-paid phone calls, and so on), and possibly other information. The summary information may include all or only a subset of all information available for the calls.

Call Summary Display state 230 is also used to process a user request to view detailed information and/or status of a particular in-progress call. For example, by pressing "Scroll Up" key 120a or "Scroll Down" key 120b, the user may be able to scroll through a list of calls. The user may also be able to press the digit corresponding to the selected call (e.g., press the "2" digit to select "Call 2"). The in-progress call currently selected may be indicated by an arrow 332 in display 330, reverse highlighting (e.g., white text on a black background), or by some other means. Upon receiving a user's request to view the selected call in detail (e.g., by the user pressing the "SEL" key), the display transitions to Single Call Display state 240 (T34 in FIG. 2).

Single Call Display state 240 is used to show detailed information and/or status for the selected call. Various types of information may be displayed for the call, depending on the size of the display screen. For example, the detailed information may include the caller name, the caller ID or phone number, the call duration, and so on, as shown by display 340 in FIG. 3E. Moreover, different types of call (e.g., voice and data) and different services may be associated with different types of pertinent information. Thus, different information may be shown for the detailed display depending on the type and/or service associated with the selected call. In the implementation shown in FIG. 3E, the "Exit", "Next", and "More" soft-keys on the display screen may be selected by the "Scroll Up", "SEL", and "Scroll Down" keys, respectively, on the keypad.

Table 1 lists some types of information that may be pertinent for calls and which may be shown in the detailed display.

TABLE 1

| Information Type | Description or Values |
| --- | --- |
| Caller name/ID | for incoming call |
| Called name | for outgoing call |
| Called number | for outgoing call |
| Connected name | for outgoing call |
| Connected number | for outgoing call |
| Call duration | time (in seconds) |
| Call status | active "[A]" or on-hold "[H]" |
| Call type | voice "[V]" or data "[D]" |
| Charging information | Current charges for the call, charge unit, and so on |
| Data call information | Attributes for data call |
| Data rate | transmit and/or receive data rates |
| Connection status | active "[A]" or dormant "[D]" |
| Activity | transmitting "[TX]" and/or receiving "[RX]" |
| Service type | packet switched, circuit switched, and so on |
| Maximum data rate | |
| Mode | GSM, GPRS, W-CDMA. CDMA, CDMA 1x-EVDO, and so on |
| Billing unit | by packets, time, or some other unit |
| IP address | |

An outgoing call may be connected to a different number than the original one (hence, the distinction between called name and connected name).

Figure 3A:
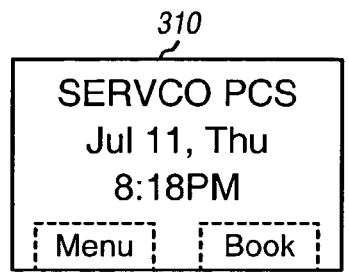
FIGS. 3A through 3F show example displays for summary information, detailed information, and other information for calls.
Figure 3B:
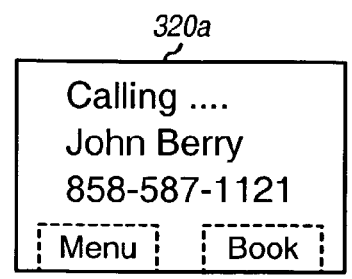
Figure 3C:
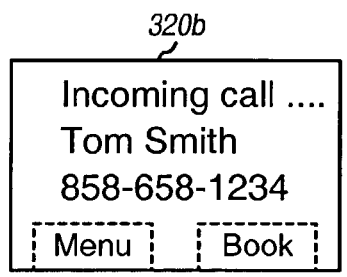
Figure 3D:
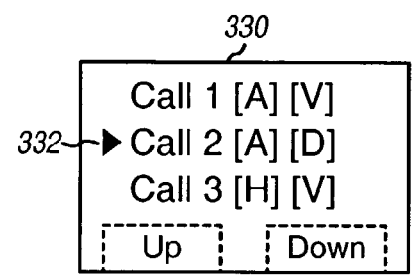
Figure 3E:
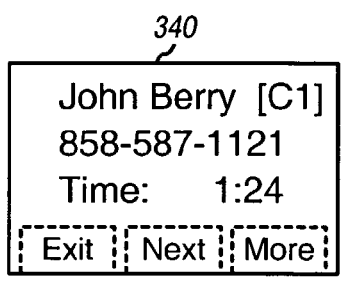

While in Single Call Display state 240, the user may request to view detailed information for another call (e.g., the next call in the call summary). This switch to the next call directly may be achieved, for example, by (1) selecting the "Next" soft-key menu option, as shown in FIG. 3E, (2) pressing a dedicated physical key, or (3) pressing and holding a physical key. Upon receiving this indication, the display remains in Single Call Display state 240 (T44 in FIG. 2) and the detailed information for the new selected call is shown on the display, as shown by display 350 in FIG. 3F.

While in Single Call Display state 240, the user may request to go back to the call summary. This may be achieved for example, by (1) selecting the "Exit" or "Back" soft-key menu option, as shown in FIG. 3E, or (2) pressing a physical "Clear" key. The user may also request to end the selected call, for example, by pressing the "End" key. The disconnected call would be removed from the list of calls. Upon receiving either of these indications, the display transitions back to Call Summary Display state 230 (T43 in FIG. 2). The call summary would then show the updated list of calls.

While in either Summary Display state 230 or Single Call Display state 240, a new outgoing call may be initiated by the user or a new incoming call may be received. The new outgoing call may be another voice call for a three-way teleconference call or a new data call. The new incoming call may be supported by call waiting feature. If the new call is an outgoing call, then the display may show the results of user actions for the new call, such as the entry of a new phone number from the keypad or the phone book. Upon initiating a new outgoing call (by the user pressing the "Send" key) or receiving an indication of a new incoming call, the display transitions to Active Call Display state 250 (T35 and T45 in FIG. 2).

Active Call Display state 250 is similar to First Active Call Display state 220 and is used to process call control messages from the network and requests from the user for the new call. The display for this state may show that the wireless device is making the new call (e.g., "Calling . . . ", as shown in FIG. 3B) or is receiving the new call (e.g., "Incoming Call . . . "). If the new call is connected (e.g., by the user pressing the "Talk" key for a new incoming call or receipt of a call connect message from the network for a new outgoing call), then the new call is added to the list of calls and the call summary is updated. Otherwise, if the new call is not connected (e.g., by the user rejecting the new incoming call or aborting the new outgoing call), then the call summary is not affected. In either case, the display transitions back to either Summary Display state 230 or Single Call Display state 240, depending on where it originated from.

While in Summary Display state 230, the user may request to end all calls that are in process (e.g., by pressing the "End" key). If all in-progress calls are disconnected, then the display would transition back to Idle Display state 210 (T31 in FIG. 2).

In an embodiment, the detailed information to be shown for a particular in-progress call is dependent on its "call category". Different call categories may be defined for different call types, different services, different combinations of call types and services, and so on. For example, a first call category may be defined for voice call, a second call category may be defined for normal data call, a third call category may be defined for premium data call (which may have additional capabilities and higher billing charges), and so on. Each in-progress call may be classified as belonging to one of the call categories. Whenever detailed information is requested for an in-progress call, its call category is ascertained, and the detailed information to be displayed for that call category would then be shown for the selected call. Each call category may thus be associated with a specific detailed display.

A default detailed display may be provided for each call category and can include various types of information deemed to be pertinent for that call category. In an embodiment, the detailed display for each call category may also be customized by the user based on personal preferences. For example, the user may display various details of the calls, hide certain calls (the user may not want to see data call displays), and so on. In this way, only the information deemed to be pertinent by the user would be displayed. Moreover, the user may be able to define the layout for each detailed view based on personal preference. Similar customization may also be made for the summary display used to show summary information for all calls that are in-progress.

Figure 3F:
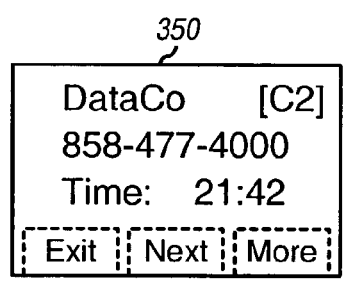

If the display screen size is smaller than that needed to show all pertinent information for a given detailed display, then one or more menu key options (e.g., a "More" menu option, as shown in FIGS. 3E and 3F) may be provided to allow the user to view additional detailed information for the selected call.

FIGS. 3A through 3F are examples of various displays that may be used to show summary information for all in-progress calls and detailed information for a selected call. For the summary display, the information for each call may be shown on one line for easy viewing. However, different information, display formats, and so on may be used for the detailed and summary displays, and this is within the scope of the invention. In general, it is desirable to provide as much pertinent information as permitted by the display screen and in formats that are easy to comprehend. The information to be displayed and the formats to be used for a given wireless device may be dependent on the types of calls/services that can be received by that device, the display capabilities of the device, and so on.

Figure 4:
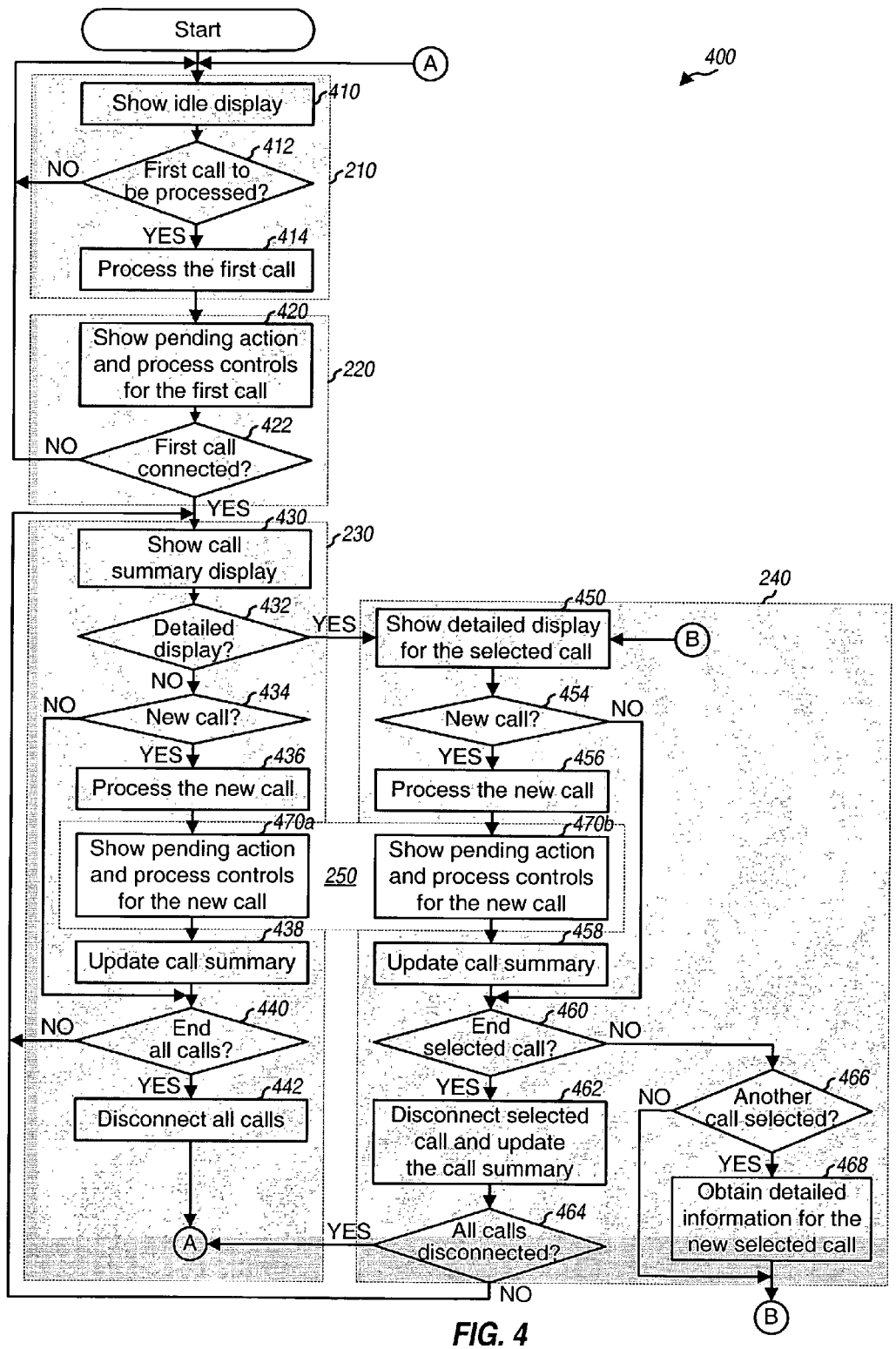
FIGS. 4 and 5 are flow diagrams of two example processes for managing the display of information for multiple calls in the wireless communication device.

FIG. 4 is a flow diagram of an embodiment of a process 400 for managing the display of information for multiple calls at a wireless device. Process 400 utilizes the state diagram shown in FIG. 2.

Initially, an idle display is shown when there are no calls in progress (step 410). If a request or indication is received to process a first call, which may be an incoming call or an outgoing call (step 412), then this call is processed (step 414). For an outgoing call, the processing may include receiving and displaying the keys pressed by the user for a phone number to be called, or displaying the phone list to the user. Steps 410 and 412 are performed in Idle Display state 210.

Upon initiating the outgoing call or receiving an indication of the incoming call, the pending action is shown on the display (e.g., "Calling . . ." or "Incoming Call . . .") and controls for the first call are processed (step 420). These controls may be a call control message from the network, user request to accept or reject the call, and so on. If the first call is not connected (as determined in step 422), then the process returns to step 410. Otherwise, the process proceeds to step 430. Steps 420 and 422 are performed in First Active Call Display state 220.

In step 430, a call summary display is shown to the user. The user may scroll through the call summary and select any one of the calls that are in progress. If only one call is pending, then this call is the selected call.

While in Call Summary Display state 230, requests from the user are processed and the appropriate displays are shown. If a user request is received to view detailed information for the selected call (as determined in step 432), then the detailed display for the selected call is shown (step 450).

If a new call (which may be an incoming call or an outgoing call) is to be processed (as determined in step 434), then the new call is processed (step 436). Upon initiating the outgoing call or receiving an indication of the incoming call, the pending action is shown on the display and controls for the new call are processed (step 470a). If the new call is connected, then the list of calls and the call summary are updated to reflect the new connected call (step 438).

If a request is received to end all calls (as determined in step 440), then all in-progress calls are disconnected (step 442), and the process returns to step 410 to show the idle display.

Steps 430 through and 442 are performed in Call Summary Display state 230 and step 470a is performed in Active Call Display state 250.

While in Single Call Display state 240, requests from the user are also processed and the appropriate displays are shown. If a new call is to be processed (as determined in step 454), then the new call is processed in step 456, 470b, and 458, as described above for steps 436, 470a, and 438, respectively. If a request is received to end the selected call (as determined in step 460), then this call is disconnected, and the list of in-progress calls and the call summary are updated (step 462). Whenever a call is disconnected, a check is made to determine whether or not all in-progress calls have been disconnected (step 464). The process would return to step 430 to show the call summary display if there is at least one in-progress call, and would return to step 410 to show the idle display if all in-progress calls have been disconnected. If a user request is received to view detailed information for another selected call (as determined in step 466), then the detailed information for this new selected call is obtained (step 468), and the process returns to step 450 to show the detailed display for the new selected call.

Steps 450 through 468 are performed in Single Call Display state 240 and step 470b is performed in Active Call Display state 250.

Figure 5:
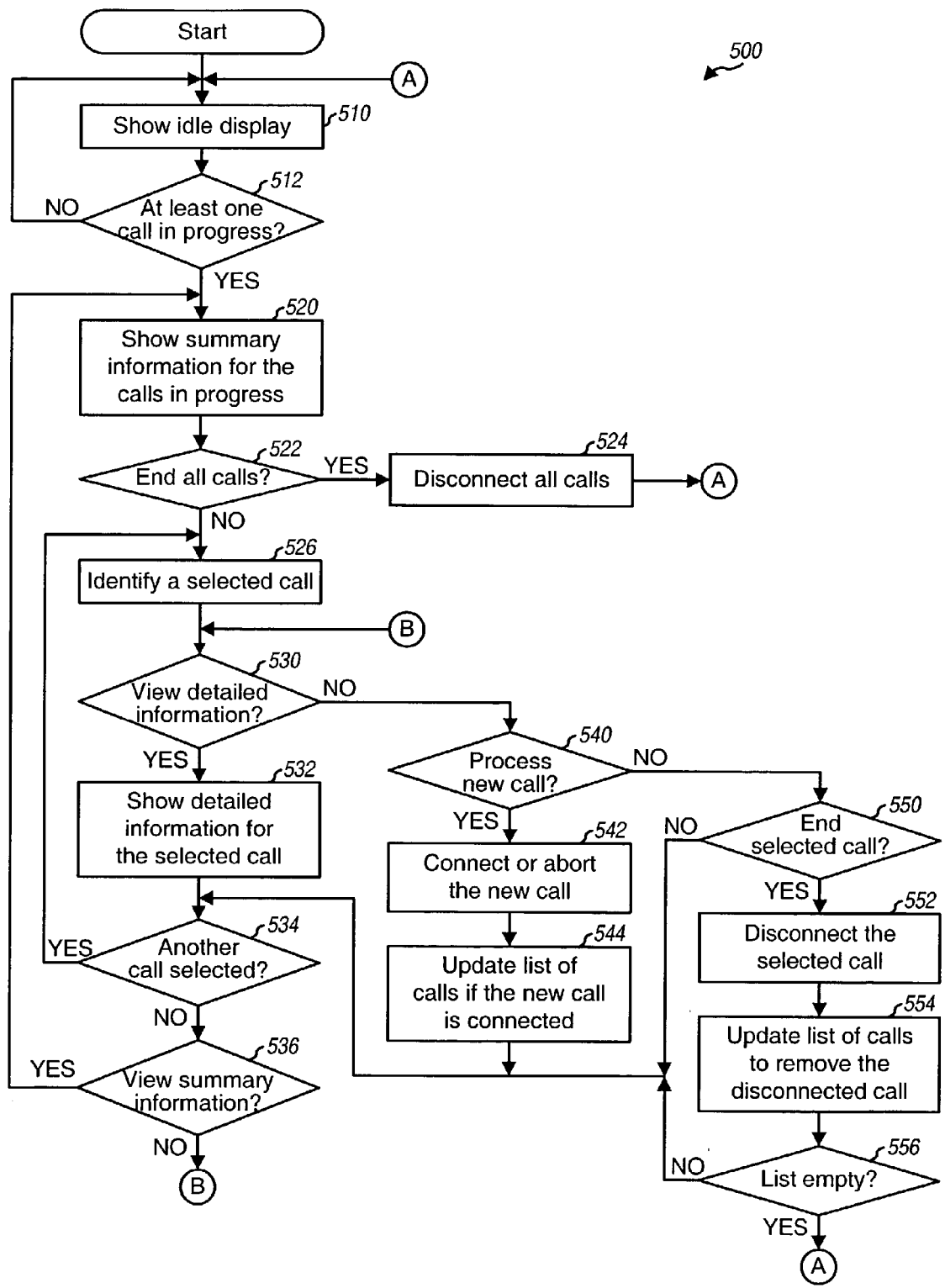

FIG. 5 is a flow diagram of another embodiment of a process 500 for managing the display of information for multiple calls at a wireless device. Initially, an idle display is shown when there are no in-progress calls (step 510). If there is at least one in-progress call (as determined in step 512), then summary information for the in-progress calls is shown (step 520). When the summary information is displayed, a determination is made whether or not a request or indication has been received to end all calls (step 522). If the answer is yes, then all in-progress calls are disconnected (step 524) and the process returns to step 510. Otherwise, if the answer to step 522 is no, then one of the in-progress calls is identified as the current selected call at any given moment (step 526).

If a request or indication is received to view detailed information for the selected call (as determined in step 530), then the detailed information for this call is obtained and shown on the display (step 532). Otherwise, the process proceeds to step 540. After step 532, a determination is made whether or not another in-progress call has been selected (step 534). If the answer is yes, then this new selected call is identified (step 526). Otherwise, a determination is made whether or not a request or indication has been received to go back to the summary display (step 536). If the answer is yes, then the summary information is again shown in the display (step 520). Otherwise, the process returns to step 530.

In step 540, a determination is made whether or not there is a new call to be processed. If the answer is yes, then the new call is either connected or aborted (e.g., based on user request) (step 542), and the list of calls is updated if the new call is connected (step 544). The process then proceeds to step 534.

If there is no new call to process in step 540, then a determination is made whether or not a request or indication has been received to end the selected call (step 550). If the answer is no, then the process proceeds to step 534. Otherwise, the selected call is disconnected (step 552) and the list of calls is updated to remove the disconnected call (step 554). If the updated list is empty (as determined in step 556), then the process proceeds to step 510 to show the idle display. Otherwise, the process proceeds to step 534.

For clarity, a specific state diagram and two flow diagrams have been described in FIGS. 2, 4, and 5. Various alternative embodiments may be derived based on the teachings described herein, and these are within the scope of the invention. For example, fewer, different, and/or additional states may be used for the call display management state diagram. Moreover, each state may be defined to perform different processing than that described above. For example, the call processing may be performed in First Active Call Display state 220 and Active Call Display state 250 instead of Idle Display state 210 and Call Summary Display state 230.

The transition between the states in the state diagram and the user inputs for the steps in the flow diagrams may be provided via the keyboard on the wireless device, icons on the display (e.g., touch screen), or by some other means.

Figure 6:
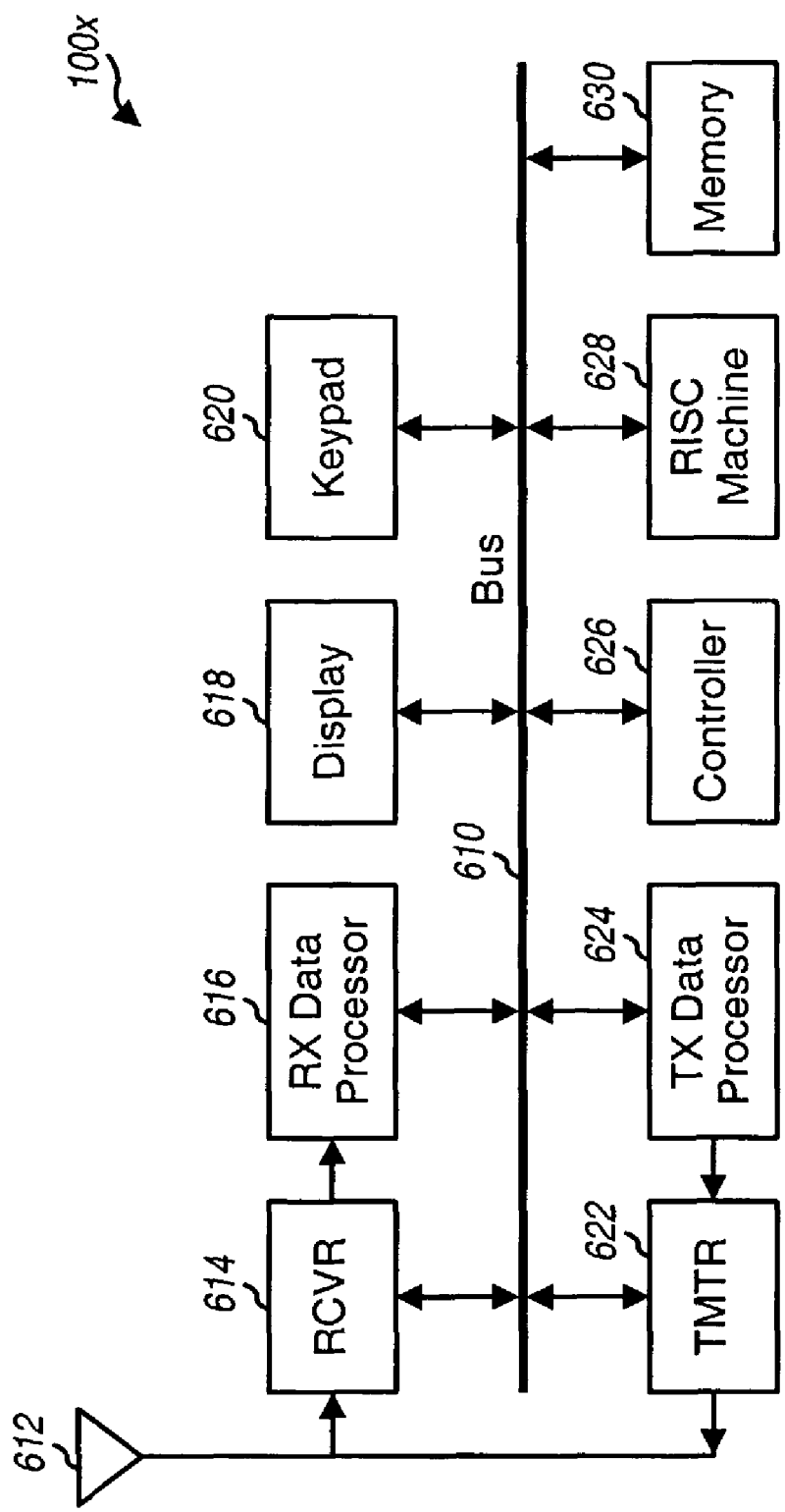
FIG. 6 is a block diagram of the wireless communication device.

FIG. 6 is a block diagram of a wireless communication device 100x, which is an embodiment of device 100 shown in FIG. 1. On the receive path, a modulated signal transmitted from a base station is received by an antenna 612 and provided to a receiver unit (RCVR) 614. Receiver unit 614 conditions (e.g., filters, amplifies, and downconverts) the received signal and further digitizes the conditioned signal to provide samples. A receive (RX) data processor 616 then demodulates and decodes the samples to provide decoded data. On the transmit path, data to be sent by the wireless device is provided to a transmit (TX) data processor 624, which encodes and modulates the data. The modulated data is then conditioned by a transmitter unit (TMTR) 622 to provide a modulated signal suitable for transmission back to the base station.

A display 618 is used to show various types of information to the user, including summary and detailed information for calls, as described above. Display 618 may be a liquid crystal display (LCD), an active matrix display, or some other type of display. A keypad 620 is used to accept user requests and inputs and may include fewer, additional, and/or different keys than those shown in FIG. 1.

A controller 626 directs the operation of the units within wireless device 100x. For example, controller 626 may direct the processing of messages/signaling exchanged with the network to receive an incoming call or to originate an outgoing call. A RISC (reduced instruction set computing) machine 628 may be used to execute codes for various functions. For example, RISC machine 628 may execute codes used to implement the state diagram shown in FIG. 2 and the process shown in FIG. 4 or 5. A memory unit 630 provides storage for program codes and data used by controller 626 and RISC machine 628, and data for other units within device 100x.

FIG. 6 shows a specific embodiment of wireless device 100x. Other embodiments may also be contemplated and are within the scope of the invention.

The techniques described herein for managing the display of information for multiple calls may be implemented in various types of wireless communication device. For example, these techniques may be implemented in cellular phones, wireless terminals, remote stations, personal digital assistants (PDAs), and so on. Moreover, these techniques may be used for various wireless communication systems including CDMA systems (e.g., IS-95, IS-2000, W-CDMA, and so on) and TDMA systems (e.g., GSM and so on).

The multi-call display management techniques described herein may be implemented by various means. For example, these techniques may be implemented in hardware, software, or a combination thereof. For a hardware implementation, the elements used to implement any one or a combination of the techniques may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the multi-call display management techniques may be implemented with modules (e.g., procedures, functions, and so on) that perform the functions described herein. The software codes may be stored in a memory unit (e.g., memory unit 630 in FIG. 6) and executed by a processor (e.g., controller 626 or RISC machine 628). The memory unit may be implemented within the processor or external to the processor, in which case it can be communicatively coupled to the processor via various means as is known in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of managing call information at a wireless communication device, the method comprising:
    displaying current status of a plurality of in-progress calls, wherein the in-progress calls comprise a voice call and a data call;
    receiving a request for detailed information associated with a first in-progress call of the plurality of said in-progress calls;
    ascertaining a call category associated with the first in-progress call; and
    displaying the detailed information for the first in-progress call in response to said request, wherein the detailed information for the first in-progress call is at least partially dependent on the call category, and wherein the detailed information for the first in progress call is of a first type when the call category is said data call, and the detailed information is of a second type when the call category is said voice call wherein the first type is different than the second type.

2. The method of claim 1, further comprising:
    receiving a request for detailed information associated with a second in-progress call, wherein the second in-progress call occurs at the same time as the first in-progress call;
    ascertaining the call category associated with the second in-progress call; and
    displaying the detailed information for the second in-progress call, wherein the detailed information for the second in-progress call is at least partially dependent on the call category.

3. The method of claim 2, wherein each call category is defined at least partially based on a call type, a service type, or a combination thereof.

4. The method of claim 3, wherein the call type is the voice call, a normal data call, or a premium data call.

5. The method of claim 2, wherein a detailed display associated with each call category is customizable based on one or more user preferences.

6. The method of claim 5, wherein a layout associated with each detailed display is definable based on one or more user preferences.

7. The method of claim 5, further comprising:
displaying a summary display, wherein the summary display includes at least a portion of the detailed information.

8. The method of claim 7, wherein the summary display is customizable based on one or more user preferences.

9. The method of claim 2, wherein the detailed information for the second in-progress call is of the first type when the call category is the data call, and the detailed information is of the second type when the call category is the voice call.

10. A computer program product including a computer readable medium having instructions for causing a computer to:
display current status of a plurality of in-progress calls, wherein the in-progress calls comprise a voice call and a data call;
receive a request for detailed information associated with a first in-progress call of the plurality of said in-progress calls;
ascertain a call category associated with the first in-progress call; and
display the detailed information for the first in-progress call in response to said request, wherein the detailed information for the first in-progress call is at least partially dependent on the call category, and wherein the detailed information for the first in-progress call is of a first type when the call category is said data call, and the detailed information is of a second type when the call category is said voice call wherein the first type is different than the second type.

11. The computer program product of claim 10, further comprising instructions for causing a computer to:
receive a request for detailed information associated with a second in-progress call, wherein the second in-progress call occurs at the same time as the first in-progress call;
ascertain the call category associated with the second in-progress call; and
display the detailed information for the second in-progress call, wherein the detailed information for the second in-progress call is at least partially dependent on the call category.

12. The computer program product of claim 11, wherein each call category is defined at least partially based on a call type, a service type, or a combination thereof.

13. The computer program product of claim 12, wherein the call type is the voice call, a normal data call, or a premium data call.

14. The computer program product of claim 11, wherein a detailed display associated with each call category is customizable based on one or more user preferences.

15. The computer program product of claim 14, wherein a layout associated with each detailed display is definable based on one or more user preferences.

16. The computer program product of claim 14, further comprising instructions for causing a computer to:
display a summary display, wherein the summary display includes at least a portion of the detailed information.

17. The computer program product of claim 16, wherein the summary display is customizable based on one or more user preferences.

18. The computer program product of claim 11, wherein the detailed information for the second in-progress call is of the first type when the call category is the data call, and the detailed information is of the second type when the call category is the voice call.

19. A wireless communication device, comprising:
means for displaying current status of a plurality of in-progress calls, wherein the in-progress calls comprise a voice call and a data call;
means for receiving a request for detailed information associated with a first in-progress call of the plurality of said in-progress calls;
means for ascertaining a call category associated with the first in-progress call; and
means for displaying the detailed information for the first in-progress call in response to said request, wherein the detailed information for the first in-progress call is at least partially dependent on the call category, and wherein the detailed information for the first in-progress call is of a first type when the call category is said data call, and the detailed information is of a second type when the call category is a voice call said voice call wherein the first type is different than the second type.

20. The wireless device of claim 19, further comprising:
means for receiving a request for detailed information associated with a second in-progress call, wherein the second in-progress call occurs at the same time as the first in-progress call;
means for ascertaining the call category associated with the second in-progress call; and
means for displaying the detailed information for the second in-progress call, wherein the detailed information for the second in-progress call is at least partially dependent on the call category.

21. The wireless device of claim 20, wherein each call category is defined at least partially based on a call type, a service type, or a combination thereof.

22. The wireless device of claim 21, wherein the call type is the voice call, a normal data call, or a premium data call.

23. The wireless device of claim 20, wherein a detailed display associated with each call category is customizable based on one or more user preferences.

24. The wireless device of claim 23, wherein a layout associated with each detailed display is definable based on one or more user preferences.

25. The wireless device of claim 23, further comprising:
means for displaying a summary display, wherein the summary display includes at least a portion of the detailed information.

26. The wireless device of claim 25, wherein the summary display is customizable based on one or more user preferences.

27. The wireless device of claim 20, wherein the detailed information for the second in-progress call is of the first type when the call category is the data call, and the detailed information is of the second type when the call category is the voice call.

28. An apparatus for managing call information at a wireless communication device, comprising:
a display configured to display current status of a plurality of in-progress calls, wherein the in-progress calls comprise a voice call and a data call;
a processor configured to receive a request for detailed information associated with a first in-progress call of the plurality of said in-progress calls, and to ascertain a call category associated with the first in-progress call; and
said display configured to display the detailed information for the first in-progress call in response to said request, wherein the detailed information for the first in-progress call is at least partially dependent on the call category, and wherein the detailed information for the first in-progress call is of a first type when the call category is said data call, and the detailed information is of a second type when the call category is said voice call wherein the first type is different than the second type.

29. The apparatus of claim 28, wherein the processor is further configured to receive a request for detailed information associated with a second in-progress call, and to ascertain the call category associated with the second in-progress call, wherein the second in-progress call occurs at the same time as the first in-progress call; and wherein the display is further configured to display the detailed information for the second in-progress call, wherein the detailed information for the second in-progress call is at least partially dependent on the call category.

30. The apparatus of claim 29, wherein each call category is defined at least partially based on a call type, a service type, or a combination thereof.

31. The apparatus of claim 30, wherein the call type is the voice call, a normal data call, or a premium data call.

32. The apparatus of claim 29, wherein a detailed display associated with each call category is customizable based on one or more user preferences.

33. The apparatus of claim 32, wherein a layout associated with each detailed display is definable based on one or more user preferences.

34. The apparatus of claim 32, wherein the display is further configured to display a summary display, wherein the summary display includes at least a portion of the detailed information.

35. The apparatus of claim 1, wherein the summary display is customizable based on one or more user preferences.

36. The apparatus of claim 29, wherein the detailed information for the second in-progress call is of the first type when the call category is the data call, and the detailed information is of the second type when the call category is the voice call.

37. At least one processor configured to manage call information at a wireless communication device, comprising:

a display module for displaying current status of a plurality of in-progress calls, wherein the in-progress calls comprise a voice call and a data call;

a first module for receiving a request for detailed information associated with a first in-progress call of the plurality of said in-progress calls;

a second module for ascertaining a call category associated with the first in-progress call; and said display module for displaying the detailed information for the first in-progress call in response to said request, wherein the detailed information for the first in-progress call is at least partially dependent on the call category, and wherein the detailed information for the first in-progress call is of a first type when the call category is said data call, and the detailed information is of a second type when the call category is said voice call wherein the first type is different than the second type.

\* \* \* \* \*